United States Patent
Chen et al.

(10) Patent No.: US 10,348,839 B2
(45) Date of Patent: Jul. 9, 2019

(54) CLOUD MANAGEMENT SYSTEMS AND DEVICE MANAGEMENT METHODS THEREOF

(71) Applicant: Acer Incorporated, New Taipei (TW)

(72) Inventors: Cheng-Hung Chen, New Taipei (TW); Chao-Kuang Yang, New Taipei (TW); Wen-Cheng Hsu, New Taipei (TW); Shih-Hao Lin, New Taipei (TW); Chia-Hsun Lee, New Taipei (TW); Chi-Hung Chang, New Taipei (TW); Tzu-Kang Huang, New Taipei (TW); Chen-Hsiang Ko, New Taipei (TW); Chi-Sheng Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 385 days.

(21) Appl. No.: 15/368,960

(22) Filed: Dec. 5, 2016

(65) Prior Publication Data

US 2017/0187812 A1    Jun. 29, 2017

(30) Foreign Application Priority Data

Dec. 29, 2015 (TW) .............................. 104144175 A

(51) Int. Cl.
*G06F 15/173* (2006.01)
*H04L 29/08* (2006.01)

(52) U.S. Cl.
CPC .............. *H04L 67/16* (2013.01); *H04L 67/10* (2013.01); *H04L 67/26* (2013.01)

(58) Field of Classification Search
USPC ....... 709/203, 206, 217, 219, 223, 224, 226, 709/228, 230, 232, 238; 705/44; 725/5;
(Continued)

(56) References Cited

U.S. PATENT DOCUMENTS 8,838,694 B2    10/2014 Dattagupta et al.
9,721,083 B2 *   8/2017 Hirakata ................. G06F 21/41
(Continued)

FOREIGN PATENT DOCUMENTS

CN    102546326 A    7/2012
CN    103365269 A    10/2013
(Continued)

OTHER PUBLICATIONS

Chinese language office action dated Nov. 22, 2016, issued in application No. TW 104144175.
(Continued)

*Primary Examiner* — Quang N Nguyen
(74) *Attorney, Agent, or Firm* — McClure, Qualey & Rodack, LLP

(57) ABSTRACT

A device management method for use in a cloud system including a remote device, a mobile device and a cloud server is provided. The method includes the steps of: using, by the mobile device and the remote device, a same login information to log in the cloud server; sending, by the remote device, a push notification message to the mobile device through the cloud server when detecting that a first device is connected to a connection port, wherein the push notification message includes first identification information corresponding to the first device; and in response to receiving the push notification message, identifying, by the mobile device, the first device according to the first identification information to activate a respective application so as to perform data transmission with the first device through the respective application.

20 Claims, 6 Drawing Sheets

(58) Field of Classification Search
USPC .............................................................. 726/9
See application file for complete search history.

(56) References Cited

U.S. PATENT DOCUMENTS

| | | | |
|---|---|---|---|
| 2011/0101085 A1 | 5/2011 | Nakagawa | |
| 2014/0081864 A1* | 3/2014 | Reese .................... | G06Q 40/02 705/44 |
| 2014/0082717 A1* | 3/2014 | Kang ...................... | G06F 21/00 726/9 |
| 2014/0237493 A1* | 8/2014 | Russo .................... | H04N 7/181 725/5 |
| 2016/0316000 A1* | 10/2016 | Huang .................... | H04L 67/10 |
| 2017/0053110 A1* | 2/2017 | Wang ...................... | G06F 21/32 |
| 2018/0212948 A1* | 7/2018 | Hao ........................ | H04L 29/06 |

FOREIGN PATENT DOCUMENTS

| | | |
|---|---|---|
| CN | 103699073 | 4/2014 |
| CN | 103699073 A | 4/2014 |
| CN | 104363213 | 2/2015 |
| CN | 104363213 A | 2/2015 |
| TW | 200745967 | 12/2007 |
| TW | 200745967 A | 12/2007 |

OTHER PUBLICATIONS

Chinese language office action dated Apr. 24, 2019, issued in application No. CN 201610008523.X.

* cited by examiner

CLOUD MANAGEMENT SYSTEMS AND DEVICE MANAGEMENT METHODS THEREOF

CROSS REFERENCE TO RELATED APPLICATIONS

This application claims priority of Taiwan Application No. 104144175, filed on Dec. 29, 2015, and the entirety of which is incorporated by reference herein.

BACKGROUND OF THE INVENTION

Field of the Invention

The invention generally relates to cloud management technology, and more particularly, to cloud management systems and device management methods thereof capable of providing cloud plug-and-play function.

Description of the Related Art

In recent years, portable devices, such as mobile or handheld devices, have become more and more advanced technology and having versatility. For example, the mobile device can receive e-mail messages, phone book has an advanced management application that allows multimedia playback, and has a variety of other functions. As these devices have the convenience versatile, making these devices indispensable in life.

In addition, with the rapid progress of science and technology and the Internet, information technology has grown rapidly, leading to a greater emphasis on Internet of Things (IoT) development and cloud computing. However, certain issues yet to be overcome before the said development can reach maturity. Therefore, the need exists for management systems and methods thereof that integrate portable devices and cloud computing technology for providing more diverse IoT applications.

BRIEF SUMMARY OF THE INVENTION

Cloud management systems and device management methods thereof are provided.

An embodiment of the invention provides a device management method for use in a cloud system including a remote device, a mobile device and a cloud server. The method includes the steps of: using, by the mobile device and the remote device, a same login information to log in the cloud server; sending, by the remote device, a push notification message to the mobile device through the cloud server when detecting that a first device is connected to a connection port, wherein the push notification message includes first identification information corresponding to the first device; and in response to receiving the push notification message, identifying, by the mobile device, the first device according to the first identification information to activate a respective application so as to perform data transmission with the first device through the respective application.

Another embodiment of the present invention provides a cloud management system comprising a first device having a connection port, a remote device having a connection port, a mobile device and a cloud server which is coupled to the remote device and the mobile device via a communication network. The mobile device and the remote device use a same first login information to log in the cloud server, and the remote device, upon detecting that the connection of the remote device is connected to the connection port of the first device, sends a push notification message to the mobile device through the cloud server, wherein the push notification message includes first identification information corresponding to the first device, and the mobile device, in response to receiving the push notification message, identifies the first device according to the first identification information to activate a respective application so as to perform data transmission with the first device through the respective application.

Methods may be practiced by the disclosed apparatuses or systems which are suitable firmware or hardware components capable of performing specific functions. Methods may also take the form of a program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof Embodiments of the invention provide cloud management systems and related device management methods, which can be perform remote controlling through the cloud, allowing remote devices and mobile devices that use identical login information for logins on the cloud and share the same cloud resources to commence data transmission. In addition, when one external device is connected to a connection port of the remote device, a message containing information related to inserted device can be automatically sent to a mobile device as notification to activate/launch a corresponding application on the mobile device, thereby collecting data at the remote end through the external device for monitoring and/or remote controlling the external device, thus achieving a goal for providing cloud plug-and-play function.

Figure 1:
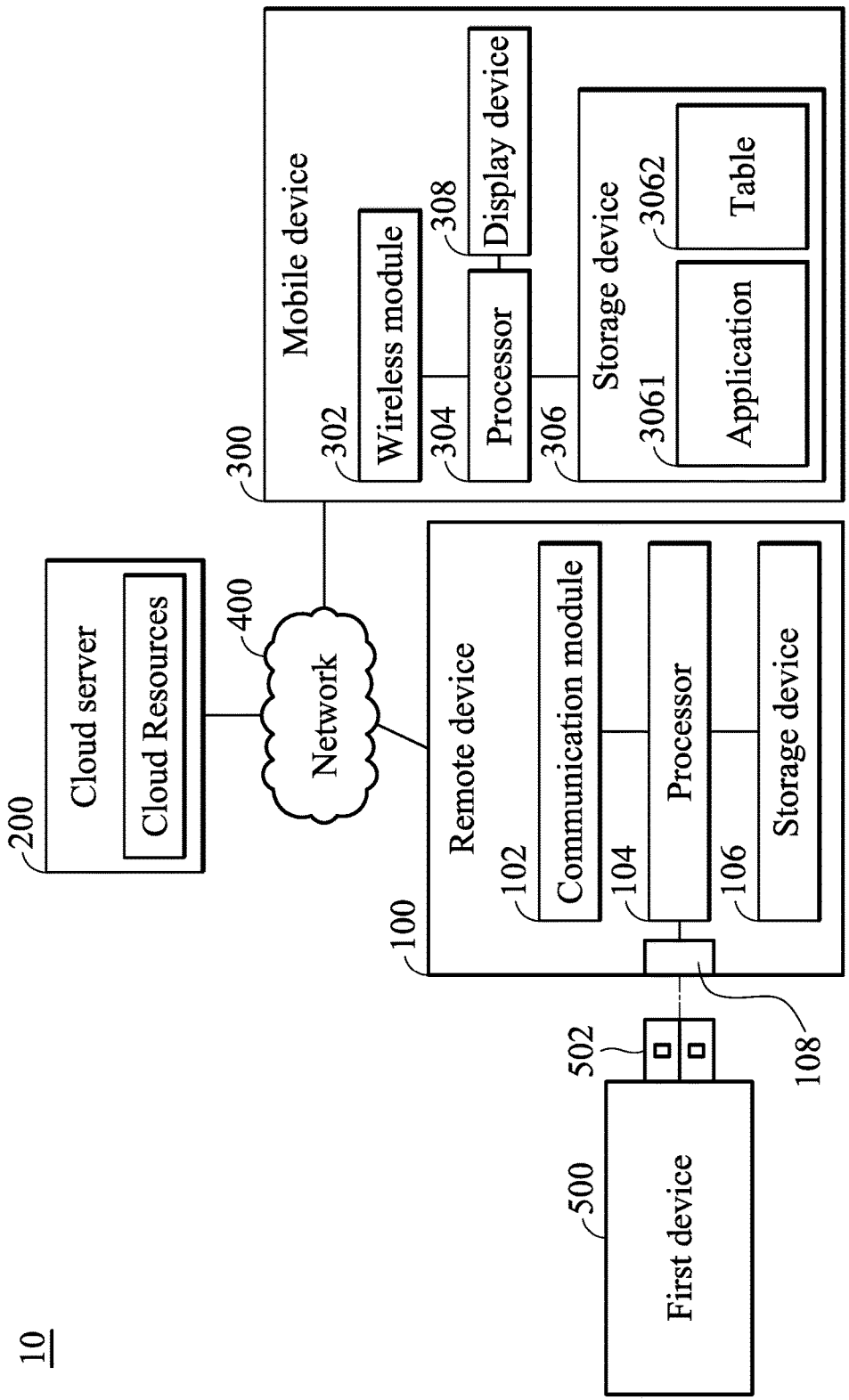
FIG. 1 is a schematic diagram illustrating an embodiment of a cloud management system of the invention.

FIG. 1 is a block diagram of a cloud management system in accordance with an exemplary embodiment of the invention. As shown in FIG. 1, the cloud management system 10 may comprise a remote device 100, a cloud server 200 and one or more mobile devices 300, wherein the remote device 100 is capable of communicating with the mobile devices 300 through the cloud server 200. To be more specific, the remote device 100 and the mobile devices 300 may be coupled to the cloud server 200 via a connected communication network 400 (e.g., any wired/wireless communication networks, such as the Internet, 3G, and/or WLAN network, etc. . . . ) and the remote device 100 and the mobile devices 300 may further communicate with the cloud server 200 via the connected communication network 400. In some embodiments, the mobile device 300 can be a portable device or a handheld device, such as a PDA, a smartphone, a mobile phone, a tablet, an Mobile internet device (MID), a laptop computer, a car computer, a digital camera, a multimedia player or a game device, or any other type of mobile computational device, however, it is to be understood that the invention is not limited thereto.

The remote device 100 at least comprises a communication module 102, a processor 104 and a storage device 106. The communication module 102 receives signals from and transmits signals to a current associated network. The communication module 102 may further comprise a wireless module (not shown), which can be coupled to one or more antennas (not shown) and may allow communications with one or more additional devices, computers and/or servers using a wireless network. The communication module 102 may support various communications protocols, such as the code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, and Wi-MAX communication protocol, and a protocol for emails, instant messaging (IM), and/or a short message services (SMS), but the invention is not limited thereto. The processor 104 may be a microprocessor which is capable of executing one or more types of computer readable medium stored in the storage device 106 such as a memory. The storage device 106 may be a memory of the remote device 100 and also may be an external storage card, such as a smart media (SM) card or secure digital (SD) card, for example. Application codes (not shown) stored in the storage device 106 are executed by the processor 104 to control the communication module 102 and the storage device 106 to perform the device management method of the invention. For example, the storage device 106 may store program codes of operating systems such as Linux operating system, Windows operating system or other similar operating system and the program codes of operating systems stored in the storage device 106 can be loaded and executed by the processor 104 to run the operating systems. In other words, the remote device 100 may be considered as a small-scale computing means having the ability to operate a specific operating system independently.

The processor 104 which is coupled to the communication module 102 and the storage device 106 can control the communication module 102 and the storage device 106 to perform the data management method of the present invention, which will be discussed further in the following paragraphs.

The remote device 100 may further include a connection port 108, which can be used to connect or insert a first device 500. For example, the connection port 108 can be any common input or output ports, such as a universal serial bus (USB) port or a high-definition multimedia interface (HDMI) port, etc., which can be connected with the first device 500 through physical wired connection, but the present invention is not limited thereto.

In some embodiments, in addition to the physical wired connections, the connection port 108 may also be provided with wireless connectivity that allows the external first device 500 to connect it in a wireless manner such as via wireless LAN or Bluetooth network or other wireless connections.

In some embodiments, the first device 500 may be a variety of sensors or detectors, wherein said sensor/detector can be used to collect or measure a variety of sensor data, such as various sensing data related to the environment such as temperature, humidity and so on.

The remote device 100 may provide device information of the first device 500 to the cloud server 200. For example, in one embodiment, device information of the first device 500 may include device-related information, such as a device code or function code and the installation information, and so on The mobile device 300 may further comprise a wireless module 302, a processor 304, a storage device 306 and a display device 308. The wireless module 302 receives signals from and transmits signals to a current associated network. It is to be understood that integrating the processor 304 into the wireless module 302 is also possible. The wireless module 302 may be coupled to one or more antennas (not shown) and may allow communications with one or more additional devices, computers and/or servers using a wireless network. The mobile device may support various communications protocols, such as the code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, and Wi-MAX communication protocol, and a protocol for emails, instant messaging (IM), and/or a short message services (SMS), but the invention is not limited thereto. The processor 304 may be one or more data processors, image processors and/or central processors, which are capable of executing one or more types of computer readable medium stored in the storage device 306 such as a memory.

The storage device 306 may be a memory of the mobile device 300 and also may be an external storage card, such as a smart media (SM) card or secure digital (SD) card, for example. The application codes 3061 stored in the storage device 306 are executed by the processor 304 to display application and respective user interface on the display device 308 (e.g. a touch panel) for the user to perform data transmission with remote device 100 using the application and respective user interface. The storage device 306 may further include a table 3062, wherein the table 3062 may contain information regarding a plurality of predetermined verified devices and their corresponding applications. The processor 304 may obtain information containing the corresponding application of each verified device from the table 3062.

Figure 2:
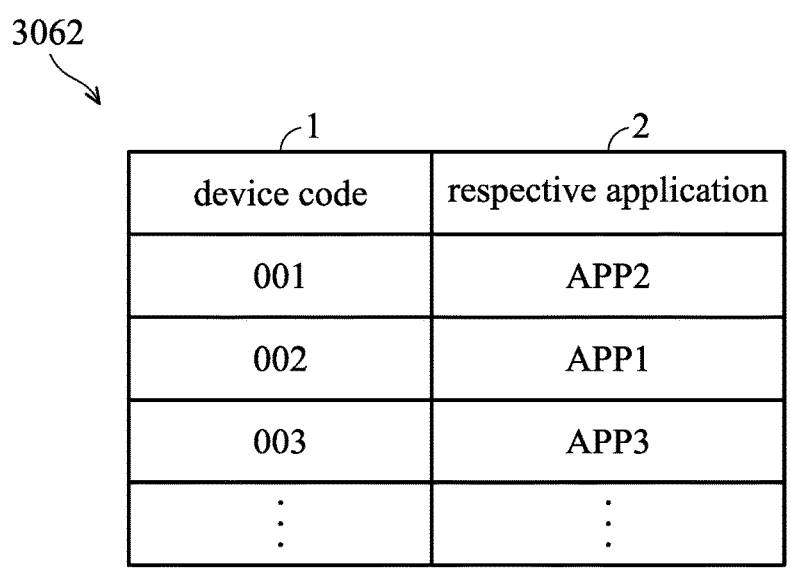
FIG. 2 is a schematic diagram illustrating an embodiment of a table of the invention.

FIG. 2 is a schematic diagram illustrating an embodiment of the table 3062 of the invention. As shown in FIG. 2, the table 3062 includes at least fields 1 and 2, wherein the field 1 is used to indicate a device code and the field 2 is used to indicate the application corresponding to the device code shown in the field 1. From the table 3062, the device code "001" corresponds to the application "APP1", the device code "002" corresponds to the application "APP2", the device code "003" corresponds to the application "APP3", and so on.

The display device 308 is configured to display related data, such as texts, figures, interfaces, and/or related information. It is understood that, in some embodiments, the display device 308 may be integrated with a touch-sensitive device (not shown). The touch-sensitive device has a touch-sensitive surface comprising sensors in at least one dimension to detect contact and movement of at least one object (an input tool), such as a pen/stylus or a finger near or on the touch-sensitive surface. Thus, users can input relevant commands or signals via the screen of the display device 308.

The processor 304 which is coupled to the wireless module 302, the storage device 306 and the display device 308 can control the wireless module 302, the storage device 306 and the display device 308 to perform the device management method of the present invention, which will be discussed further in the following paragraphs.

The cloud server 200 is coupled to the remote device 100 and the mobile device 300 through the communication network 400 to perform the device management method of the present invention, so as to manage the access of the cloud resources of the remote device 100 and the mobile device 300, which will be discussed further in the following paragraphs. Generally, cloud resources correspond to login information such as user account, wherein different login information correspond to different cloud resources, while the same login information can share the same cloud resources.

Figure 3:
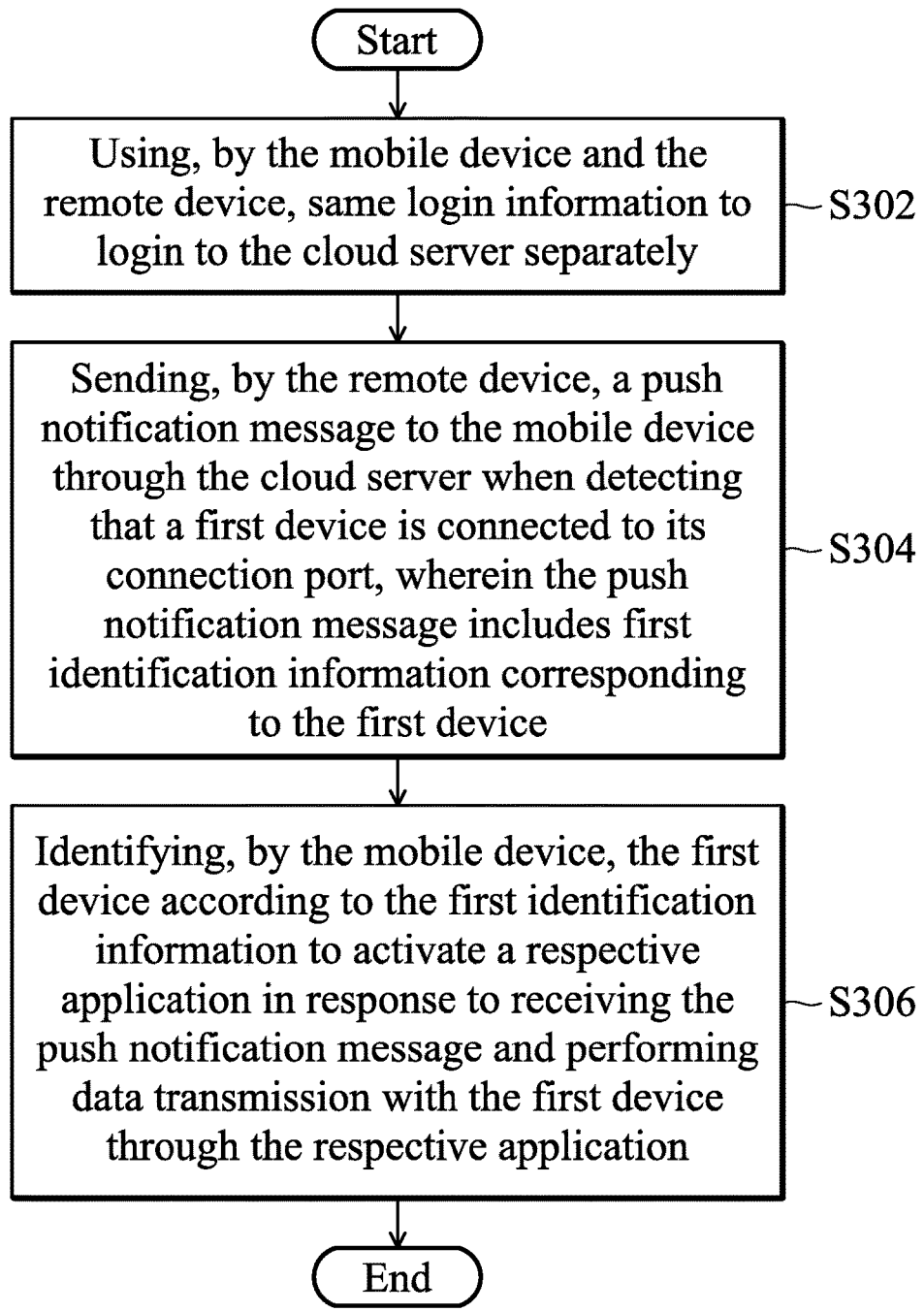
FIG. 3 is a flowchart of an embodiment of a device management method of the invention.

FIG. 3 is a flowchart of an embodiment of a device management method for providing remote controlling in a communication network of the invention. The device management method can be applied to the cloud management system 10 as shown in FIG. 1. For example, the method can be performed by the processor 104 of the remote device 100, the cloud server 200 and the processor 304 of the mobile device 300 as shown in FIG. 1.

First, in step S302, the remote device 100 and the mobile device 300 each log in the cloud server 200 using the same first login information. In some embodiments, the first login information contains at least a login account and a password corresponding to the login account and the login account corresponds to a specific cloud resource of the cloud server 200. In other words, as the remote device 100 and the mobile device 300 use the same login account and password to log in the cloud server 200, both the remote device 100 and the mobile device 300 share one particular cloud resource.

In this embodiment, the remote device 100 may further include a connection port (e.g., the connection port 108). For example, the connection port 108 can be a universal serial bus (USB) port or a high-definition multimedia interface (HDMI) port, etc. After the remote device 100 logs in the cloud server 200, it can perform read and write operations on specific cloud resource of the cloud server 200.

Subsequently, in step S304, the remote device 100 sends a push notification message to the mobile device 300 through the cloud server 200 when detecting that a first device 500 is connected or inserted to its connection port (e.g., a USB port), wherein the push notification message includes first identification information corresponding to the first device 500. For example, a first device 500 may have a connection port 502 of a type as same as that of the connection port 108, which can be used to insert into the connection port 108 of the remote device 100. For example, when the connection port 108 is a USB port, the first device 500 may be an electronic device having a USB port. As for the first device 500, it has a device code for the remote device 100 to identify what type of device the first device is. To be more specific, when the remote device 100 detects the first device 500 has been inserted into the connection port 108 (i.e., the connection port 502 is connected to the connection port 108), it identifies the type to which the first device 500 belongs based on the device code of the first device 500 and through which a push notification message including first identification (ID) information of the first device 500 is generated and then delivered to the cloud server 200. Then, the cloud server 200 will send the push notification message to the mobile device 300. In some embodiments, the storage device 106 of the remote device 100 may also include a list of verified devices, which includes a number of verified devices, their codes, and related information. Additionally, the remote device 100 may further determine whether or not the device code of the first device 500 is in the list. If so, the type to which the first device 500 belongs can be identified to generate the above-mentioned push notification message; conversely, if the device code of the first device 500 is not in the list, a request will be sent to perform a verification procedure with the cloud server 200. After successful verification, the first device 500 and its device code will be added to the list of verified devices to generate the above-mentioned push notification message and have it uploaded to the cloud server 200, thereby updating the list of verified devices in the cloud server 200. Afterwards, the mobile device 300 can receive the abovementioned push notification message containing the first ID information through the cloud server 200.

When receiving the abovementioned push notification message, in step S306, the mobile device 300 identifies the first device 500 and activates a corresponding application based on the first ID information and performs the data transmission with the first device 500 through the activated application. Specifically, the mobile device 300 may include a table (such as: a table 3062). This table may contain information regarding a number of predetermined verified devices and their corresponding application. For example, the predetermined verified device can be a device in the list of verified devices of the cloud server 200, while the mobile device 300 can retrieve resources in the cloud server 200 in advance to obtain the list of verified devices and its device information and install an application corresponding to the device information. On the other hand, the abovementioned list contains a record containing the information of a device (e.g., device name, code, type, etc.) and information pertaining to the device's corresponding relationship with the application. In other words, through the list, the mobile device 300 can determine if the device corresponding to the first ID represented by the push notification message is one of the verified devices and find its corresponding application to automatically activate it. This corresponding application of the first device 500 that is inserted into the remote device 100 can then retrieve cloud resources and perform the data transmission with the first device 500.

In some embodiments, the step of performing the data transmission with the first device 500 may comprise collecting, by the mobile device 300, information provided by the first device 500 through respective application. In this case, the first device 500 can be regarded as the data collector, which is used to collect specific data and upload it to the cloud server 200.

Figure 4:
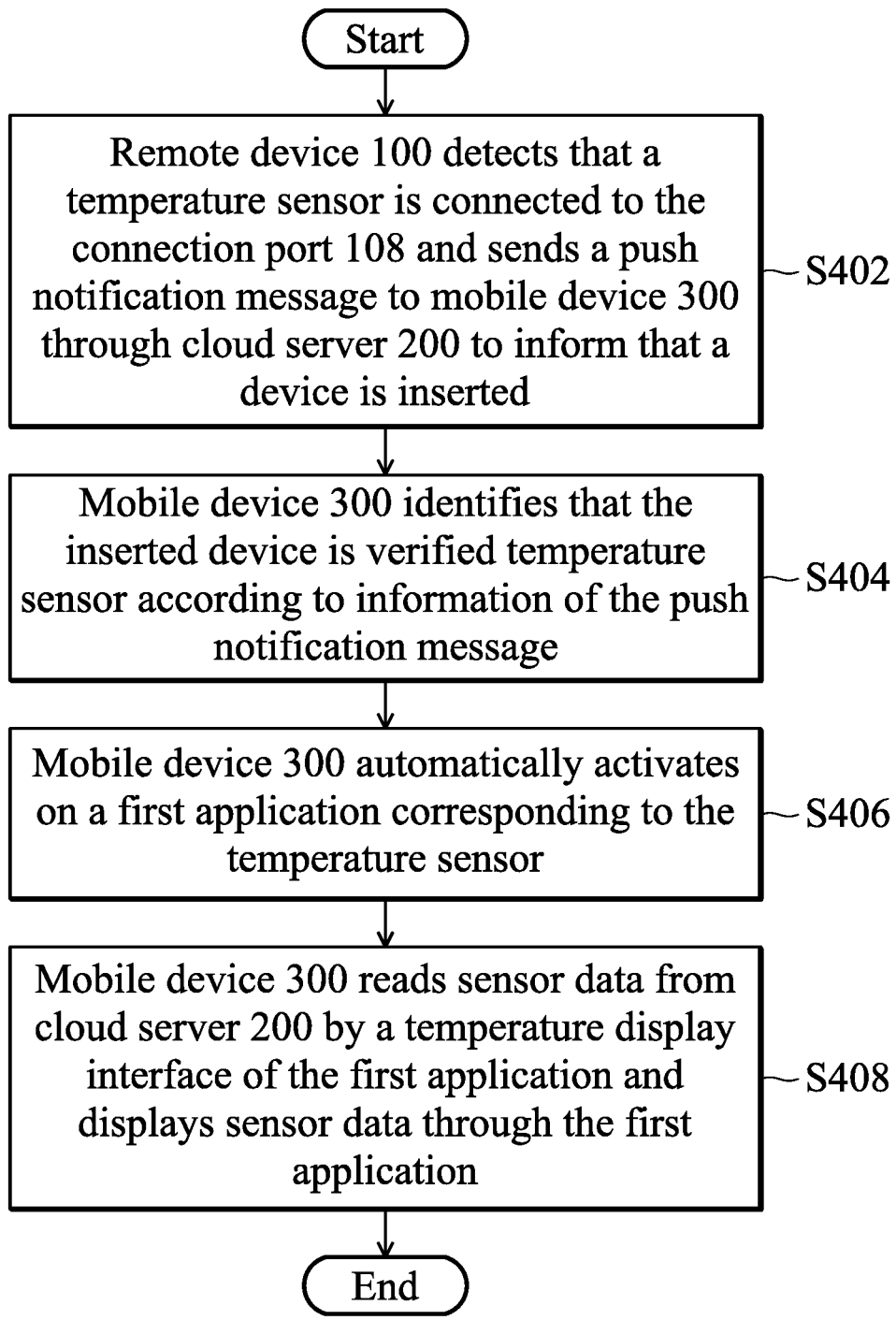
FIG. 4 is a flowchart of another embodiment of a device management method of the invention.

In one embodiment, the first device 500 may include a sensor device (for example: a temperature sensor, a light sensor, a humidity sensor, etc.) and the sensor device may provide sensor data to the mobile device 300 such that the mobile device 300 displays sensor data through a first application. FIG. 4 is a flowchart of another embodiment of a device management method for performing data collection through inserted device of the invention. In this embodiment, the device management method can be applied to the cloud management system 10 as shown in FIG. 1. In this embodiment, it is assumed that the first device 500 is a temperature sensor.

When the remote device 100 detects that a temperature sensor has been inserted into the connection port (e.g., a USB port) 108, it sends a push notification message notify the mobile device 300 that a device has been inserted (step S402). Subsequently, the mobile device 300 identifies that the inserted device is a temperature sensor that has been verified based on information of the push notification message, thus achieving the goal for providing cloud plug-and-play function (step S404). After identifying the temperature sensor, the mobile device 300 automatically activates a first application (App) corresponding to the temperature sensor, wherein the first App is equipped with a temperature display interface (step S406). Then, when the temperature sensor performs temperature sensing in a preset environment, the sensor information of the environment temperature detected will be generated and sent to the cloud server. The mobile device 300 may read the sensor information of the cloud server 200 through the temperature display interface of the first App and then display the sensor information through the first App (step S408).

In some embodiments, the first App may further provide the remote control function of a home appliance. The user may carry out automatic subsequent processing based on the sensor information obtained. For example, the user may remotely control a home appliance (e.g. an air conditioner) with temperature regulation function through a mobile device. When the sensor information displays "Temperature too high", the temperature will be automatically lowered; when the sensor information displays "Temperature too low", the temperature will be automatically elevated. By doing so, a goal for remote controlling can be achieved.

In some embodiments, the first device 500 may include a barcode scanner, which can supply a barcode data to the mobile device 300 such that the mobile device 300 displays the barcode data through a second App. For example, the first device 500 may be a barcode scanner. When the remote device 100 detects that a barcode scanner has been inserted into the connection port (e.g., the USB port) 108, the remote device 100 sends a push notification message through the cloud server 200 to notify the mobile device 300 that a device has been inserted. Based on information included in the push notification message, the mobile device 300 can then identify whether or not the inserted device is a barcode scanner that has been verified, thereby achieving the purpose of cloud plug-and-play. After the mobile device 300 identifies that the inserted device is a barcode scanner that has been verified, it automatically activates the second App corresponding to the barcode scanner. The second App has a barcode information display interface. Subsequently, when the barcode scanner scans a product barcode and generates a bar code data, the bar code data will be uploaded to the cloud server 200. The mobile device 300 can then read the bar code data on the cloud server 200 through the barcode information display interface of the second App. Then, the mobile device 300 decodes the barcode data to display second information corresponding to the barcode data through the barcode information display interface of the second App. For example, the second information may include product-related information related to the barcode data, such as product name, amount, date of generation, validity period and so on, but the invention is not limited thereto. The mobile device 300's user may have quick access to product information based on the second information displayed by the second App, thus simplifying the purchase process.

In some embodiments, in addition to the physical wired connection, the connection port can also be provided with wireless connectivity, for allowing the external first device 500 to connect wirelessly.

In some embodiments, the respective applications may also provide a control command generation interface, allowing the user to generate a control command by programming control code directly using specific programming languages, such as Javascript, C++, live code, and other programming languages, or import control code via the control command generation interface to read and write cloud resources corresponding to the first login information.

In some embodiments, the step of performing the data transmission with the first device 500 may comprise the step of performing, by the mobile device 300, remote controlling on the first device 500 through the application corresponding to the first device 500 for controlling the first device 500 to perform a designated action. Meanwhile, the first device 500 may be considered a controlled unit, which is connected to particular units, and the mobile device 300 can remotely control the actions of the specific units via the cloud server 200.

Figure 5:
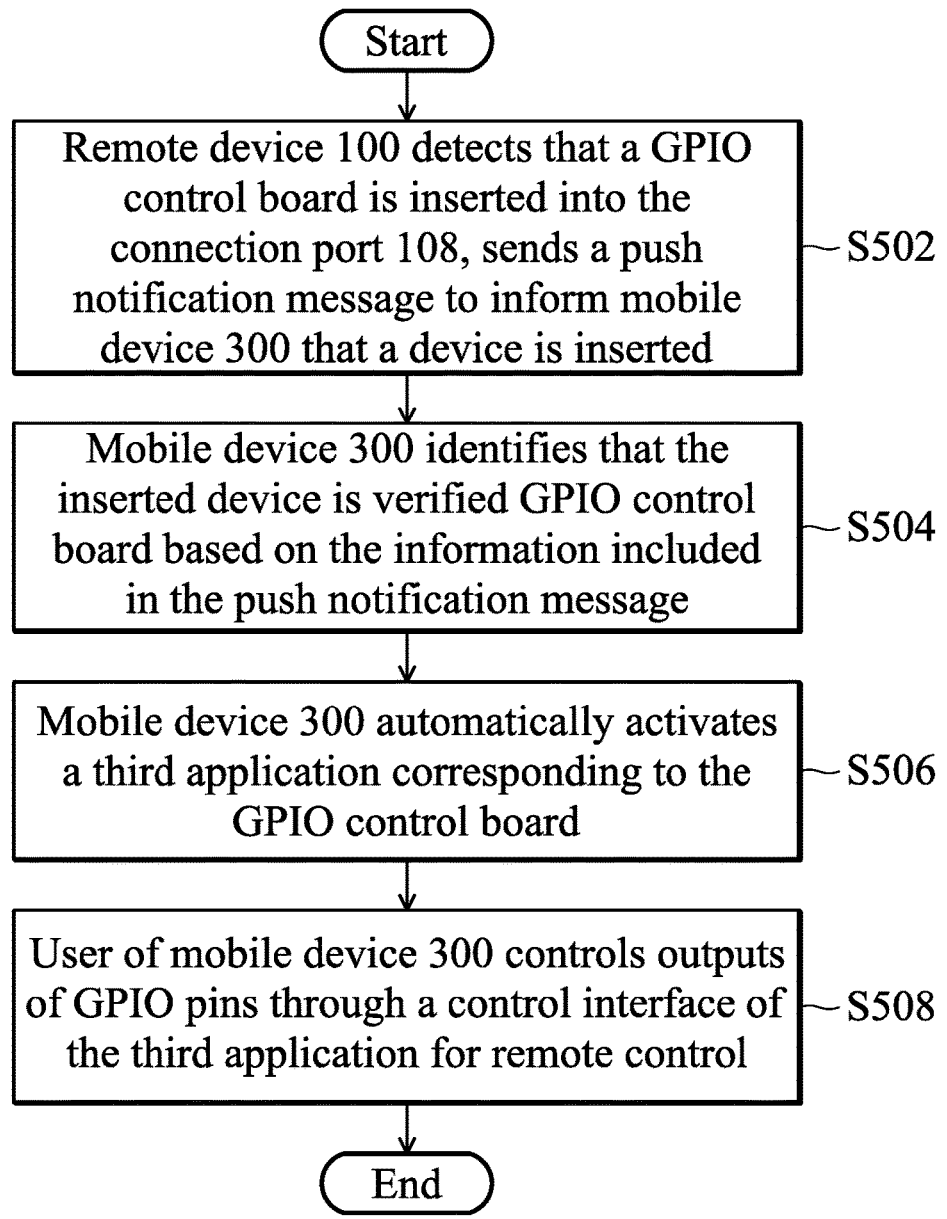
FIG. 5 is a flowchart of another embodiment of a device management method of the invention.

For example, please refer to FIG. 5. FIG. 5 is a flowchart of another embodiment of a device management method for performing remote controlling on the inserted device of the invention. The device management method can be applied to the cloud management system 10 as shown in FIG. 1. In this embodiment, it is assumed that the first device 500 includes one control unit (e.g. a general purpose input/output (GPIO) control board) with one or several GPIO pins. These GPIO pins can be connected to different hardware components, such as a motor (e.g. a stepper motor), a light-emitting component (e.g., a light-emitting diode (LED)) and so on.

When the remote device 100 detects that a GPIO controlboard has been inserted into its connection port (e.g., the USB port) 108, it sends a push notification message to notify the mobile device 300 that a device has been inserted through the cloud server 200 (step S502). Then, the mobile device 300 identifies that the inserted device is a GPIO control board that has been verified based on information of the push notification message, thus achieving the goal for providing cloud plug-and-play function (step S504). After identifying the GPIO control board, the mobile device 300 automatically activates a third application (App) corresponding to the GPIO control board, wherein the third App is equipped with a respective control interface (step S506). Subsequently, the mobile device 300's user can control the outputs of GPIO pins through the control interface of the third App, thereby achieving the purpose of remote control (step S508).

Figure 6:
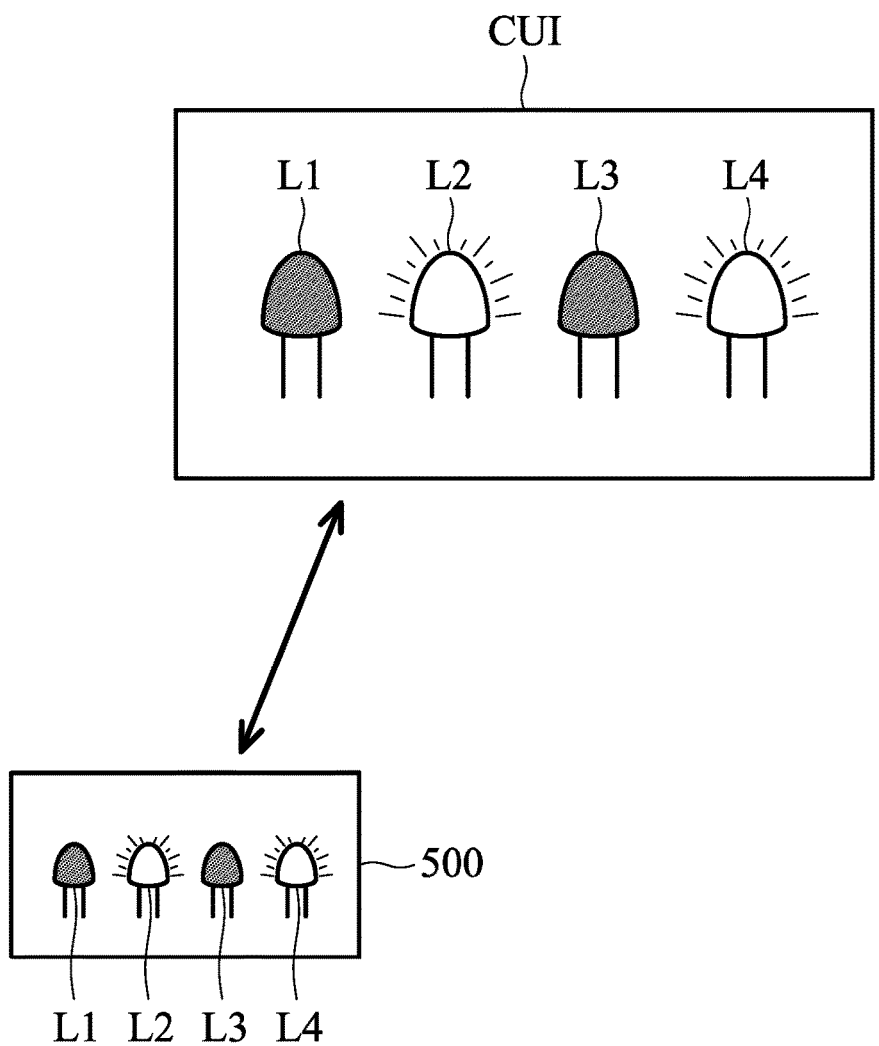
FIG. 6 is a schematic diagram illustrating an embodiment of a control interface of the application of the invention.

For example, referring to FIG. 6, FIG. 6 is a schematic diagram illustrating an embodiment of a control interface of the application of the invention. In this embodiment, the first device 500 is a GPIO control board whose pins are connected to four LEDs L1-L4. The control interface CUI of the third App can display four corresponding LEDs corresponding to LEDs L1-L4. In particular, the third App is automatically activated through the abovementioned message transmission process when the remote device 100 detects a GPIO control board has been inserted into its connection port 108. As shown in FIG. 6, the user may directly operate the control interface CUI of the third App to control the ON (1) or OFF (0) of the four LED, thus achieving the purpose of remote control.

In some embodiments, when a second device inserted is not a verified device, it means this device may be a newly added device or an illegitimate one. If that is the case, it will not be necessary for the remote device 100 to notify the mobile device 300 and configuration of the first device 500 on the remote device 100 will be denied.

In another embodiment, when the second device is not a verified device, the remote device 100 may still send the push notification message containing information of the inserted device through the cloud server 200 to the mobile device 300. On the mobile device 300, when the second device has been identified to be an unverified device, the user will be requested to provide verification data to perform the verification procedure with the cloud server 200. The cloud server 200 can then perform a cross match to determine if the verification data provided by the user and the stored verification are identical. If so, information related to the inserted device will be added to the list of verified devices in the cloud server 200, and the inserted device will be linked to a corresponding fourth App. Meanwhile, the second device inserted will be configured on the remote device 100. If the fourth App has not yet been installed on the mobile device 300, the mobile device 300 may automatically download it, or it may redirect the user to the corresponding page for a manual download to be initialized. The corresponding relationship between the second device and the fourth App will be added to its table. Then, when the second device is re-inserted into the remote device 100, the mobile device 300 can be able to find the fourth App based on the corresponding relationship specified in the table and automatic activate the fourth App, thereby interacting with the second device through the fourth App.

Therefore, the cloud management systems and related device management methods of the invention can allow remote devices and mobile devices that use identical login information for logins on the cloud and share the same cloud resources to perform data transmission and can automatically send a message containing information related to an inserted device to a mobile device as notification to activate/launch a corresponding application on the mobile device when one external device is inserted to the connection port of the remote device, thereby collecting data at the remote end through the external device for monitoring and/or remote controlling the external device, thus achieving a goal for providing cloud plug-and-play and providing more diversified IoT applications.

Systems and method thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A device management method for use in a cloud system including a remote device, a mobile device and a cloud server for providing remote controlling in a communication network, the method comprising:
    using, by the mobile device and the remote device, a same first login information to log in the cloud server;
    sending, by the remote device, a push notification message to the mobile device through the cloud server when detecting that a first device is connected to a connection port of the remote device, wherein the push notification message includes first identification information corresponding to the first device; and
    in response to receiving the push notification message, identifying, by the mobile device, the first device according to the first identification information to activate a respective application so as to perform data transmission with the first device through the respective application.

2. The device management method of claim 1, wherein the first login information includes a login account and a password corresponding thereto.

3. The device management method of claim 1, wherein the step of performing the data transmission with the first device through the respective application further comprises:
    collecting, by the mobile device, information provided by the first device through the respective application.

4. The device management method of claim 3, wherein the first device is a sensor, and the step of collecting, by the mobile device, information provided by the first device through the respective application further comprises:
    providing, by the sensor, sensor information to the mobile device; and
    displaying, by the mobile device, the sensor information through the respective application.

5. The device management method of claim 3, wherein the first device is a barcode scanner, and the step of collecting, by the mobile device, information provided by the first device through the respective application further comprises:
    providing, by the first device, a bar code data to the mobile device; and
    displaying, by the mobile device, second information corresponding to the bar code data through the respective application.

6. The device management method of claim 1, wherein the step of performing the data transmission with the first device through the respective application further comprises:
    performing, by the mobile device, a remote control operation on the first device through the respective application for controlling the first device to perform a specific operation.

7. The device management method of claim 1, wherein the first device is wirelessly connected to the connection port of the remote device.

8. The device management method of claim 1, wherein the respective application further provides a control command generation interface for generating a control code to access cloud resources corresponding to the first login information on the cloud server.

9. The device management method of claim 1, further comprising:
    providing a list of verified devices;
    determining, by the remote device, whether the first device is in the list of verified devices prior to sending the push notification message to the mobile device;

when determining that the first device is in the list of verified devices, sending the push notification message; and when determining that the first device is not in the list of verified devices, not sending the push notification message.

10. The device management method of claim 1, further comprising:

providing a list of verified devices;

identifying, by the mobile device, whether the first device is in the list of verified devices; and performing a verification procedure with the cloud server by the mobile device to add the first device to the list of verified devices when the first device is not in the list of verified devices.

11. A cloud management system, comprising:

a first device having a connection port;

a remote device having a connection port;

a mobile device; and a cloud server coupled to the remote device and the mobile device via a communication network, wherein the mobile device and the remote device use a same first login information to log in the cloud server, and the remote device, upon detecting that the connection of the remote device is connected to the connection port of the first device, sends a push notification message to the mobile device through the cloud server, wherein the push notification message includes first identification information corresponding to the first device, and the mobile device, in response to receiving the push notification message, identifies the first device according to the first identification information to activate a respective application so as to perform data transmission with the first device through the respective application.

12. The cloud management system of claim 11, wherein the connection port of the remote device is a universal serial bus (USB) port or a high-definition multimedia interface (HDMI) port.

13. The cloud management system of claim 11, wherein the mobile device further performs the data transmission with the first device through the respective application by collecting information provided by the first device through the respective application.

14. The cloud management system of claim 13, wherein the first device is a sensor-based device.

15. The cloud management system of claim 13, wherein the first device is a barcode scanner.

16. The cloud management system of claim 11, wherein the mobile device further performs the data transmission with the first device through the respective application by performing a remote control operation on the first device through the respective application for controlling the first device to perform a specific operation.

17. The cloud management system of claim 16, wherein the first device is a general purpose input/output (GPIO) control board.

18. The cloud management system of claim 11, wherein the first device is wirelessly connected to the connection port of the remote device.

19. The cloud management system of claim 11, wherein the remote device is a small-scale computing means having the ability to operate a specific operating system to operate independently.

20. The cloud management system of claim 11, wherein the mobile device system is a handheld device or a portable device.

* * * * *